United States Patent [19]

Golovko et al.

[11] 3,979,335
[45] Sept. 7, 1976

[54] PROCESS FOR THE PREPARATION OF SYNTHETIC ZEOLITES

[76] Inventors: Georgy Anatolievich Golovko, Pushkin, bulvar A.Tolstogo, 16, kv. 29, Leningrad; Boris Alexandrovich Lipkind, ulitsa Burevestnika, 9, kv. 3; Albina Timofeevna Slepneva, ulitsa L.Tolstogo, 5, kv. 50, both of, Gorky; Alexandr Semenovich Leontiev, ulitsa Gagarina, 13, kv. 13, Salavat, Bashkirskaya ASSR; Vladimir Mikhailovich Mazin, ulitsa Michurinskaya, 111, kv. 54, Tambov; Elena Nikolaevna Berezovskaya, ulitsa Engelsa, 13, kv. 67, Gorky; Valentin Alexandrovich Burylov, ulitsa Kuibysheva, 7, kv. 69, Gorky; Alexandr Mikhailovich Zubkov, ulitsa Geroev Kosmosa, 7, kv. 148, Gorky; Olga Alexeevna Konakova, ulitsa Nevzorovoi, 39, kv. 8, Gorky; Alexandr Ivanovich Judaev, ulitsa Pushkina, 22, kv. 4, Salavat, Bashkirskaya ASSR; Valentin Nikolaevich Pavlychev, ulitsa Chapaeva, 9, kv. 7, both of Salavat, Bashkirskaya ASSR; Jury Yakovlevich Ignatov, ulitsa Kolomenskaya, 33/40, kv. 59; Evgeny Alexandrovich Kharitonov, ulitsa Petra Lavrova, 21, kv. 5, both of Leningrad, all of U.S.S.R.

[22] Filed: Dec. 27, 1974

[21] Appl. No.: 537,110

[52] U.S. Cl. ............................................. 252/455 Z
[51] Int. Cl.$^2$ ............................................. B01J 29/06
[58] Field of Search ............................... 252/455 Z

[56] References Cited
UNITED STATES PATENTS

| | | | |
|---|---|---|---|
| 3,065,054 | 11/1962 | Haden, Jr. et al. | 252/455 Z |
| 3,158,579 | 11/1964 | Pollitzer et al. | 252/455 Z |
| 3,234,147 | 2/1966 | Drost et al. | 252/455 Z |
| 3,324,047 | 6/1967 | Hansford | 252/455 Z |
| 3,326,797 | 6/1967 | Young | 252/455 Z |

*Primary Examiner*—Carl F. Dees
*Attorney, Agent, or Firm*—Steinberg and Blake

[57] ABSTRACT

A process for the preparation of synthetic zeolites comprising mixing zeolite powder of a particle size not exceeding 5 mcm with a natural binder of a particle size of 250–500 A. The resulting mixture is wetted with water and pelletized, the pellets thus obtained being calcined at 600°–700°C.

10 Claims, No Drawings

PROCESS FOR THE PREPARATION OF SYNTHETIC ZEOLITES

The present invention relates to a process for the preparation of inorganic substances, and in particular, it concerns a process for the preparation of synthetic zeolites.

Synthetic zeolites are used as adsorbents in the adsorption purification, drying and separation of various gases including the separation of argon-oxygen, argon-nitrogen, neon-helium-nitrogen and other gas mixtures at low temperatures (below 120°K).

It is known to use synthetic zeolites of the type A in the crystalline form for purifying argon from oxygen.

It is also known to use synthetic zeolites of the X type in the crystalline form for purifying argon from oxygen.

The use of crystalline zeolites in stationary adsorbers and in adsorbers with a moving adsorber bed is complicated since it results in an increased resistance of the adsorbers and premature wear of communications and fittings due to an inevitable washing-off of microscopic particles of zeolites.

For that reason, moulded zeolites (in the form of spheres or tablets and the like), with or without a binder, are preferably used for the production purposes.

It should be noted that known moulded zeolites without a binder are prone to a rapid destruction in the course of multicycle operation in low-temperature adsorption processes e.g. in purifying argon from oxygen) because they do not sufficiently withstand abrupt cyclic changes in temperature during the adsorption/recovery cycle. In addition, such zeolites are rather inefficient under the dynamic conditions of operation.

The stability of synthetic zeolites against destruction can be materially improved by using a binder.

It is known to prepare synthetic zeolites in a process wherein zeolite powder with a particle size not exceeding 5 mcm is mixed with a natural binder - kaolinite - with a particle size 800–1000 A. The resulting mixture is wetted with water, pelletized, and the pellets are calcined at 600°–700°C.

The use of coarse particles of kaolinite as binder results in a reduced mechanical strength of zeolites. In addition, a considerable reduction of adsorption capacity of zeolites is in this case inevitable, especially under the dynamic conditions of operation due to the clogging of the entry pores of zeolite crystals with the binder.

It is an object of the present invention to provide a process for the preparation of synthetic zeolites having an elevated mechanical strength and higher dynamic activity with respect to the components being adsorbed.

With this and other objects in view, the invention consists in the provision of a process for the preparation of synthetic zeolites comprising mixing zeolite powder of a particle size not exceeding 5 mcm with a natural binder of a particle size of 250–500 A, wetting the resulting mixture with water and pelletizing it, with subsequent calcination of the pellets thus obtained at 600°–700°C.

Natural binders preferably comprise plastic kaolinites or hydromica varieties.

Moulded pellets are preferably dried at 150°–200°C prior to the calcination.

In order to improve the dynamic activity of zeolites, the pellets are preferably leached prior to the calcination with 1–10% solution of caustic soda, sodium carbonate or sodium silicate at 75°–95°C with subsequent washing of the pellets with water to pH=6–8 and calcination at 350°–450°C.

After the washing with water, the pellets are preferably dried at 150°–200°C to a residual moisture content of 20–25% prior to the calcination.

In order to modify the size of the entry pores of zeolites after the leaching, the pellets are preferably treated with 1–1.5N aqueous solution of calcium chloride, potassium chloride or silver nitrate prior to the washing with water.

For the same purpose, the pellets may be treated with the same solutions after the calcination at 600°–700°C, with subsequent washing with water to pH=6–8 and calcination at 350°–400°C.

The process for the preparation of synthetic zeolites according to the invention has the following advantages as compared to the known process.

In contrast to the known methods, the employment of plastic kaolinites and hydromica varieties with a particle size of 250–500 A as binder simplifies the moulding process and permits to obtain substantially spherical pellets of a size of 2–3 mm having an elevated strength in a rather simple way.

The drying of the pellets at 150°–200°C with subsequent calcination at 600°–700°C also contributes to an improved mechanical strength of zeolites. As a result, the zeolites according to the invention have a mechanical strength which is 30–100% greater than known zeolites with a binder.

The above-described steps also result in an improved heat resistance of the zeolites according to the invention.

The leaching of zeolite pellets with 1–10% solution of caustic soda, sodium carbonate or sodium silicate, with subsequent washing with water results in the unblocking of the entry pores of zeolite crystals and material improvement of dynamic activity of zeolites.

Repeated drying of zeolites to a residual moisture content of 20–25% and calcination at 350°–450°C result in the restoration of the mechanical strength of the pellets.

Thus, the process according to the invention permits the obtaining of synthetic zeolites having an elevated mechanical strength and high dynamic activity suitable for use in commercial absorbers having a wide field of application.

The process for the preparation of synthetic zeolites is preferably carried out as follows. Zeolite powder with a particle size not exceeding 5 mcm of different minerological types (preferably of the A or X type) in any cation-exchange form is mixed with natural binders having a particle size of 250–500 A.

The natural binders comprise plastic varieties of natural kaolinite and hydromica having a homogeneous structure.

The presence of too fine particles (1–250 A) in the binder results in clogging of the major part of the pores of zeolite crystals with the binder. It should be noted that the employment of the binder basically consisting of coarse particles of a size from 500 to 2000 A reduces the mechanical strength of zeolite pellets due to an insufficient cohesion surface between the particles.

The amount of the binder in the mixture with zeolite powder is from 10 to 30%, and preferably from 20 to 25% of the mass of the final zeolite product. Insufficient quantity of the binder (less than 10%) hinders the process of pelletizing and materially diminishes the mechanical strength of zeolite with only insignificant improvement of the adsorption capacity. The use of the binder in an amount exceeding 30% is inexpedient because it results in impaired adsorption properties of the adsorbent.

The mixture stirred to obtain a homogeneous mass is moulded into tablets of 2–3 mm with subsequent formation of spherical pellets having an average size of 2–2.5 mm.

The resulting pellets are dried at 150°–200°C for 3–5 hours (to a residual moisture content of 20–25%) and are then subjected to a long-term calcination at 600°–700°C for 12–24 hours, preferably 18–20 hours.

The drying of pellets contributes to a gradual elimination of the major part of the moisture without any destruction of the pellets, while the long-term calcination at 600°–700°C provides for complete removal of moisture and improves the mechanical strength of the pellets.

The pellets thus prepared are leached with 1–10% aqueous solution of caustic soda, sodium carbonate or sodium silicate at 75°–95°C for 3–5 hours. The leaching of the pellets contributes to substantial unblocking of the entry pores of the zeolite crystals and materially improves the dynamic activity of the zeolite (by 30–50%).

After the leaching, the zeolite pellets are washed with water in an amount of 20 kg per 1 kg of zeolite to remove an excess of alkali and to improve the absorption and selection properties of zeolite.

The pellets washed from the excess of alkali are dried as described above and calcined at 400°–450°C for 3–4 hours.

Where it is required to impart specific properties to the zeolite, e.g. an improved dynamic activity or selectivity, cation exchange of Na for Ca, K, Ag and the like is effected after the leaching, where the starting zeolite powder comprises NaA or NaX. It should be noted that, depending on the size of cation substituting sodium, a required enlargement of reduction of the size of entry pores of zeolite takes place. The reactants for the cation exchange process comprise 1–1.5 N solutions of respective salts, such as calcium chloride, potassium chloride, silver nitrate and the like.

The duration of the cation-exchange process is from 2 to 8 hours at 20°–60°C.

The invention will be better understood from the following specific examples illustrating the embodiments of the process for the preparation of synthetic zeolites.

EXAMPLE 1

2 kg of zeolite powder NaA of a particle size of 1–5 mcm were mixed with 0.4 kg of natural binder - plastic kaolinite - of a particle size of about 400A. The resulting mixture was wetted with water to obtain a mouldable mass. The mass was milled and fed to a moulding machine. The resulting pellets were dried in a muffle furnace at 150°C for four hours and then calcined at 600°–650°C for 18 hours. After the calcination, the pellets were leached with 6% aqueous solution of caustic soda for four hours at 90°C under stirring. Then the pellets were washed with water to pH=6-7, dried at 180°C to a residual moisture content of 20–25% and again calcined for three-four hours at 420°C.

The resulting synthetic zeolite of the NaA type had the following characteristics:

| | | |
|---|---|---|
| 1. | Bulk mass, g/cm$^3$ | 0.9 |
| 2. | Crush strength, kg per pellet of 2.5 mm diameter | 4.5 |
| 3. | Dynamic activity, mg/cm$^3$ | |
|   | (a) in water vapours | 235 |
|   | (b) in oxygen (T=93°K) | 200 |
| 4. | Vibration resistance (abrading resistance), % of the mass | less than 0.05 |
| 5. | Water resistance, % of the mass | more than 99 |

During the test of dynamic activity in oxygen, the resulting zeolite of the NaA type was subjected, after the calcination, to evacuation to a residual gas pressure of about $1.10^{-2}$ mmHg and was then cooled at 93°K. Then zeolite was charged into an absorber, and a mixture of argon and oxygen or pure oxygen was passed therethrough until the absorbent was saturated.

The heat resistance of zeolite in the course of cyclic operation in the calcination/low-temperature absorption mode and the dynamic activity thereof were tested by rapidly heating (at about 50°C per minute) up to 430°C and substantially instantaneously cooling in liquid nitrogen. Every 10 cycles the pellets were tested.

The strength of the pellets exhibited a minor reduction (by 10–15%) only during the initial 10–20 cycles, and then it remained practically unchanged for hundreds of cycles. The dynamic activity of zeolite in oxygen also underwent no substantial changes with a reduction by 5–15% during initial 10–20 cycles.

EXAMPLE 2

Synthetic zeolite was prepared as described in Example 1, but without leaching.

The resulting zeolite had the following characteristics.

| | | |
|---|---|---|
| 1. | Bulk mass, k/cm$^3$ | 0.82 |
| 2. | Crush strength, kg per pellet of 2.5 mm diameter | 4 |
| 3. | Dynamic activity, mg/cm$^3$ | |
|   | (a) in water vapours | 95 |
|   | (b) in oxygen (T=93°K) | 125 |
| 4. | Vibration resistance (abrading resistance), % of the mass | less than 0.08 |
| 5. | Water resistance, % of the mass | more than 98. |

The test conditions in testing the resulting zeolite as regards the heat resistance and dynamic activity in oxygen in the course of cyclic operation in the calcination/low-temperature adsorption, as well as the results of these tests were similar to those described in Example 1.

EXAMPLE 3

2.kg of zeolite powder of the NaX type with a particle size of 2–5 mcm were mixed with 0.2 kg of natural binder - kaolinite - with a particle size of 280 A. The mass was wetted with water, stirred, plasticized and moulded. The resulting pellets were dried at 200°C for two hours, calcined at 700°C for 15 hours and leached with 3% aqueous solution of caustic soda for two hours at 90°C under stirring. After the leaching, Na cations were exchanged for Ca cations by treating the pellets with 1.5N solution of CaCl$_2$. Then the pellets were washed with water to pH=7 (20 kg/kg) and calcined without any predrying at 450°C for four hours.

A part of the zeolite (0.5 kg) prepared as described above was leached and, after the calcination at 700°C, subjected to the cation exchange process from Na to Ca by treating the pellets with 1.5N solution of CaCl$_2$ at 25°C for eight hours, whereafter the pellets were washed with water and calcined as described in Example 1.

The resulting synthetic zeolites of the CaX type with binder had the following characteristics:

| | | with leaching | without leaching |
|---|---|---|---|
| 1. | Bulk mass, g/cm$^3$ | 0.75 | 0.8 |
| 2. | Crush strength, kg per pellet of 2.8 mm diameter | 4.2 | 3.9 |
| 3. | Dynamic activity, mg/cm$^3$ | | |
| | (a) in water vapours | 145 | 100 |
| | (b) in benzene | 70 | 52 |
| | (c) in nitrogen (T=77°K) | 180 | 115 |
| 4. | Vibration resistance (abrading resistance)% of the mass | less than 0.1 | less than 0.15 |
| 5. | Water resistance, of the mass | more than 99 | more than 95 |

The test conditions in testing the resulting CaX zeolite as regards the heat resistance and dynamic activity in the course of cyclic operation in the calcination/low-temperature absorption mode were similar to those described in Example 1, with the only difference that nitrogen was absorbed in this case.

EXAMPLE 4

2 kg of zeolite powder NaX with a particle size of 1–5 mcm were mixed with 0.6 kg of natural binder - plastic hydromica variety with a particle size of about 500 A. The resulting mixture was treated in the same manner as described in Example 1, but the leaching was effected with 10% aqueous solution of NaOH at 75°C, and the pellets were again calcined at 350°C for 24 hours.

The resulting synthetic zeolite of the NaX type with the binder had the following characteristics:

| | | |
|---|---|---|
| 1. | Bulk mass, g/cm$^3$ | 0.70 |
| 2. | Crush strength kg per pellet of 2.5 mm diameter | 3.2 |
| 3. | Dynamic activity, mg/cm$^3$ | |
| | (a) in water vapours | 147 |
| | (b) in nitrogen (T=77°K) | 190 |
| 4. | Vibration resistance (abrading resistance), % of the mass | less than 0.15 |
| 5. | Water resistance, % of the mass | more than 99 |

EXAMPLE 5

2.5 kg of crystalline zeolite of the NaA type were mixed with 0.45 kg of natural binder - kaolinite - with a particle size of about 300 A. The pellets were obtained as described above (see Example 1). The pellets were leached with 2% aqueous solution of sodium silicate for five hours at 85°C under stirring. Then Na cations were exchanged for silver by treating with 1.25N solution of silver nitrate at 20°C for eight hours. After about 20% of sodium cations were exchanged for silver cations, the pellets were washed with water using 20 kg of water per kg of zeolite to obtain pH=8. Then the pellets were dried at 180°C for four hours to obtain a residual moisture content of 21% and calcined at 360°C for three hours. The resulting zeolite of the AgNaA type had a bulk mass of 0.95 g/cm$^3$ and a crush strength of up to 4 kg per pellet of 2.8 mm diameter.

EXAMPLE 6

1.5 kg of crystalline zeolite of the NaA type were mixed with 0.35 kg of natural binder - kaolinite - with a particle size of 250 A, and, after the preparation of pellets, drying and calcination thereof as described in Example 1, the pellets were leached with 10% aqueous solution of NaOH for three hours at 80°C under stirring. After the leaching, the pellets were treated with 1N solution of potassium chloride at 60°C for two hours.

After the cation-exchange treatment, the pellets were washed with water to obtain pH=7, dried at 180°C for four hours to a residual moisture content of 25% and calcined at 380°C for four hours.

The resulting synthetic zeolite of the KA type with binder had a bulk mass of 0.72 g/cm$^3$, mechanical strength by 30%, dynamic activity in water vapours by 20% and in oxygen by 50% greater as compared to the KA type zeolites obtained by known methods.

EXAMPLE 7

2.5 kg of crystalline zeolite NaA were mixed with 0.5 kg of natural binder - plastic kaolinite - with a particle size of 300 A. The mixture was wetted with water to obtain a mouldable mass and pelletized. The resulting pellets were calcined at 650°C for 20 hours.

The resulting synthetic zeolite of the NaA type with binder had the following characteristics:

| | | |
|---|---|---|
| 1. | Bulk mass, g/cm$^3$ | 0.84 |
| 2. | Crush strength, kg per pellet of 2.7 mm diameter | 2.1 |
| 3. | Dynamic activity in water vapours, mg/cm$^3$ | 88 |
| 4. | Vibration resistance (abrading resistance), % of the mass | less than 0.1% |
| 5. | Water resistance, % of the mass | more than 97 |

What is claimed is:

1. A process for the preparation of synthetic zeolite pellets of high mechanical strength and dynamic activity comprising mixing zeolite powder of a particle size not exceeding 5 mcm with a natural clay binder of a particle size of 250–500 A; wetting the resulting mixture with water and pelletizing the same; and calcining the resulting pellets at 600°–700°C.

2. A process according to claim 1, wherein the natural clay binder comprises plastic kaolinites.

3. A process according to claim 1, wherein the natural clay binder comprises plastic hydromica varieties.

4. A process according to claim 1, wherein the pellets are dried at 150°–200°C to a residual moisture content of 20–25% prior to the calcination.

5. A process according to claim 1, wherein the pellets after the calcination are leached with 1–10% aqueous solution of a sodium compound selected from the group consisting of caustic soda, sodium carbonate, and sodium silicate at 75°–95°C, with subsequent washing of the pellets with water to pH=6–8 and calcination at 350°–450°C.

6. A process according to claim 5, wherein the pellets are treated after the leaching and before the washing with water with 1–1.5N aqueous solution of a salt selected from the group consisting of calcium chloride, potassium chloride and silver nitrate.

7. A process according to claim 5, wherein the pellets are dried at 150°–200°C to a residual moisture content of 20–25% after the washing with water and before the calcination.

8. A process according to claim 1, wherein the pellets are treated after the calcination with 1–1.5N aqueous solution of a salt selected from the group consisting of calcium chloride potassium chloride and silver nitrate, with subsequent washing of the pellets with water to pH=6–8 and calcination at 350°–450°C.

9. A process according to claim 1 wherein the particle size of said zeolite powder is between 1–5 mcm.

10. A process according to claim 1 wherein the calcining of the pellets at 600°–700°C is carried out for 12–24 hours.

* * * * *